US007399091B2

(12) United States Patent
Lockett et al.

(10) Patent No.: US 7,399,091 B2
(45) Date of Patent: Jul. 15, 2008

(54) METHOD AND APPARATUS FOR CREATING AND DISPLAYING IMAGES

(76) Inventors: John Hamilton Lockett, 12120 Esther Lama Dr., Ste 100, El Paso, TX (US) 79936; John Hoyl Lockett, 4505 W. 93rd St., Prairie Village, KS (US) 66207

( * ) Notice: Subject to any disclaimer, the term of this patent is extended or adjusted under 35 U.S.C. 154(b) by 155 days.

(21) Appl. No.: 11/333,021

(22) Filed: Jan. 17, 2006

(65) Prior Publication Data

US 2007/0165195 A1 Jul. 19, 2007

(51) Int. Cl.
*G03B 21/00* (2006.01)
*F21V 11/00* (2006.01)
*F21V 1/12* (2006.01)

(52) U.S. Cl. ........................ 353/120; 362/351; 362/360

(58) Field of Classification Search ................... 353/10, 353/30, 100, 120, 119, 121, 122; 359/451–454, 359/460, 478; 362/360, 362, 351, 355, 311; 352/232, 86; 40/700
See application file for complete search history.

(56) References Cited

U.S. PATENT DOCUMENTS

| | | | | |
|---|---|---|---|---|
| 1,586,114 | A | 5/1926 | Pence | |
| 2,177,204 | A | 10/1939 | Buzick et al. | |
| 2,680,317 | A | 6/1954 | Lewis | |
| 2,823,477 | A | 2/1958 | Willard | |
| 2,974,435 | A | 3/1961 | Eschenroeder | |
| 3,292,287 | A | 12/1966 | Marn | |
| 3,456,106 | A | 7/1969 | Gluschkin | |
| 3,945,139 | A | 3/1976 | Miller | |
| 3,990,166 | A | 11/1976 | Nagelkirk | |
| 4,001,576 | A | 1/1977 | Goddard | 240/108 B |
| 4,163,998 | A | 8/1979 | Anderson | |
| 5,598,652 | A | 2/1997 | Nurre | |
| 5,654,552 | A | 8/1997 | Toombs | 250/462.1 |
| 5,833,349 | A | 11/1998 | Apple | 362/84 |
| 5,975,725 | A | 11/1999 | Ireland-Stacy | 362/537 |
| 6,082,877 | A | 7/2000 | Hughes | |
| 6,729,747 | B1 | 5/2004 | Wirayani | |
| 6,742,915 | B1 * | 6/2004 | Westerheide | 362/360 |
| 6,821,002 | B1 | 11/2004 | Morgen | |
| 2002/0112386 | A1 | 8/2002 | Thomas | |
| 2003/0218883 | A1 | 11/2003 | Thevenot | 362/362 |
| 2004/0130899 | A1 | 7/2004 | Skouras et al. | |
| 2005/0018433 | A1 | 1/2005 | Gerfers | |

* cited by examiner

*Primary Examiner*—Melissa Jan Koval
(74) *Attorney, Agent, or Firm*—Chase Law Firm, L.C.

(57) ABSTRACT

A method and apparatus are provided for creating and displaying images. An inner lens of transparent sheet material is formed, which may have a generally pyramidal configuration and presents a plurality of inner sides. A plurality of image sectors are created equal in number to the number of inner sides and are assembled on a medium, which may be translucent, conforming in shape to the inner sides. An outer lens is formed of transparent sheet material and presents outer sides conforming in shape to the shape of the inner sides. The inner lens nests within the outer lens with the image medium held therebetween to provide an envelope assembly. The envelope assembly may be supported on a lamp base whereby a light source backlights and penetrates the image to create a desired visual effect.

12 Claims, 3 Drawing Sheets

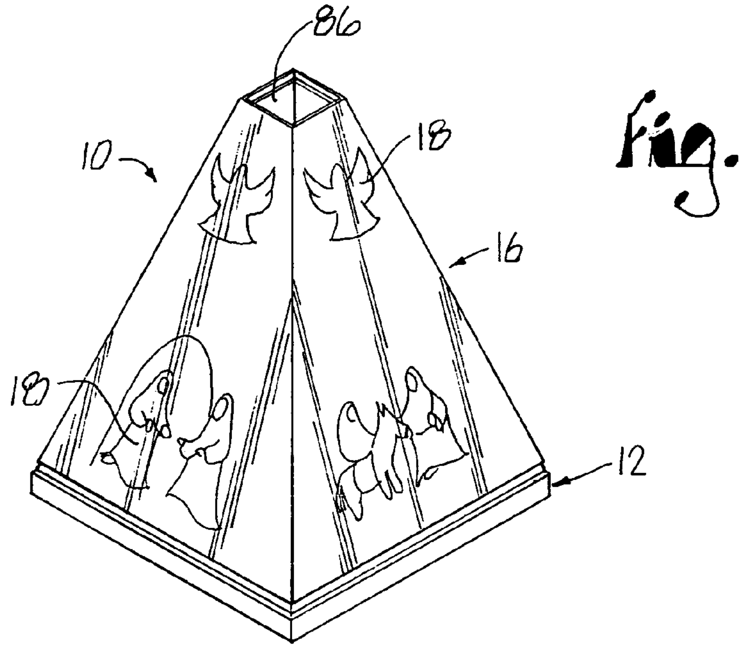
Fig. 1
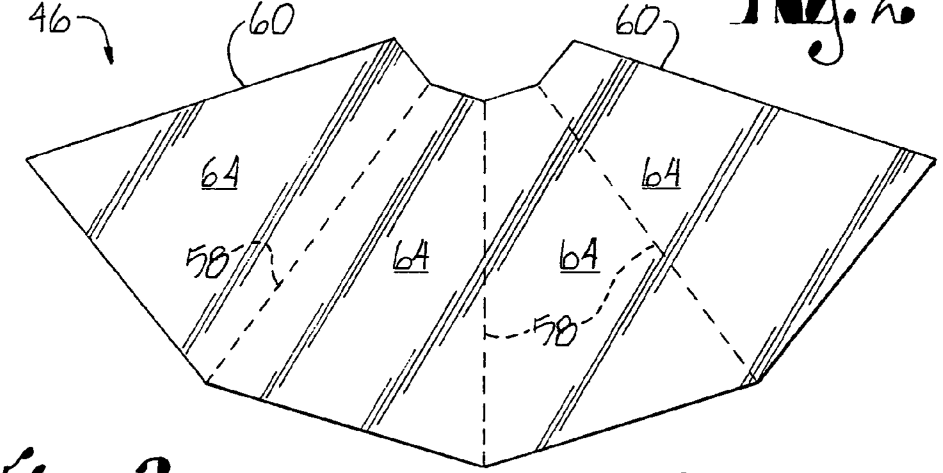
Fig. 2
Fig. 3
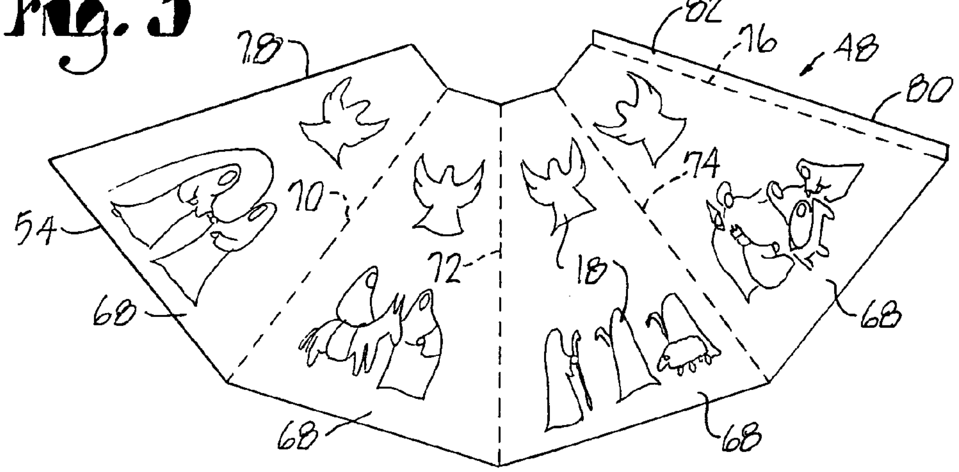

METHOD AND APPARATUS FOR CREATING AND DISPLAYING IMAGES

BACKGROUND OF THE INVENTION

This invention relates to an image displaying device wherein the images are readily interchangeable by the user depending on the aesthetic effect desired. More particularly, the invention relates to the method of creating and displaying the images.

It is desirable to offer a lamp capable of displaying and illuminating desired images. It is even more desirable for those images to be easily interchangeable or replaceable to enable the user to be expressive through images and editorial in different ways, at different times throughout the year and even through new and different media.

SUMMARY OF THE INVENTION

In response to the above, in an embodiment of the subject invention a method of making interchangeable images for use with an illuminated image displaying device is provided.

Furthermore, a method is provided for forming display images created by scanning and printing the images, then grouping and aligning the images as desired to form a combined image that fits between nesting inner and outer lenses, the combined image adapted to be backlit for a desired effect.

Another aspect of the invention is to provide an image-bearing sheet material for use with a lampshade that is die-cut and then joined to form a combined image having a generally pyramidal shape and that rests between inner and outer lenses, to form a lampshade.

Furthermore, an embodiment of the invention provides a lampshade having inner and outer transparent lenses that nest together and sandwich interchangeable images therebetween.

Another embodiment of the invention provides a truncated pyramid form for a lampshade.

Furthermore, still another aspect of the present invention is to provide a lampshade that is supported in an upright position on the base of the lamp with the shade's continuous lower edge resting on a ledge provided at the periphery of the base of the lamp.

Other advantages of this invention will become apparent from the following description taken in connection with the accompanying drawings, wherein is set forth by way of illustration and example, an embodiment of the present invention.

BRIEF DESCRIPTION OF THE DRAWINGS

FIG. 1 is a perspective view of the image displaying lamp as fully assembled;

FIG. 2 is a plan view of the flat, transparent sheet material utilized to form the inner and outer lenses, score lines being shown in dashed lines;

FIG. 3 is a plan view of the flat, translucent medium containing the combined image, score lines being shown in dashed lines;

DETAILED DESCRIPTION

Figure 8:
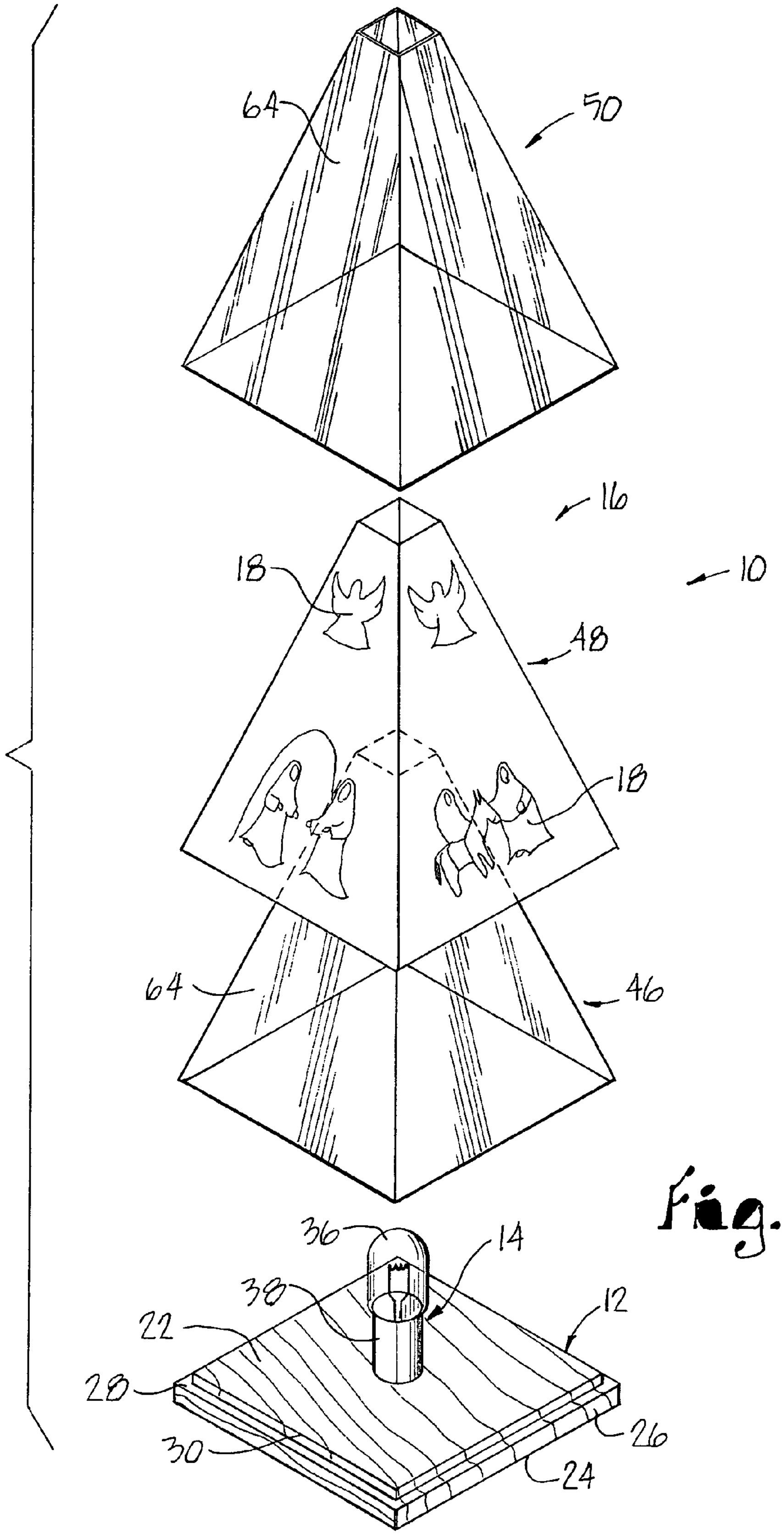
FIG. 8 is an exploded perspective view of the lamp of FIG. 1.

An image displaying lamp 10, as best seen in FIGS. 1 and 8, includes a lamp base 12, light source 14 and lampshade 16. The lampshade 16 has images 18 that may be selected by the user depending on the aesthetic effect desired.

Figure 7:
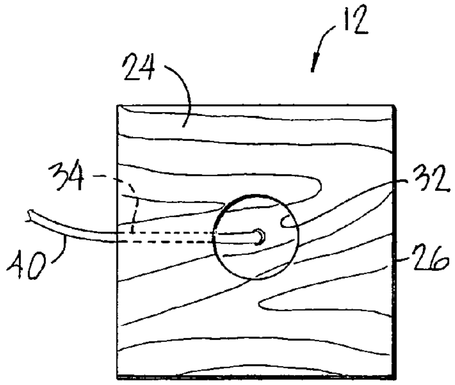
FIG. 7 is a bottom view of the lamp of FIG. 1.

The wooden lamp base 12 has a flat top surface 22, a flat bottom surface 24 and a square peripheral edge 26. The edge 26 presents a continuous ledge 28 with a tapered lip 30 extending upwardly from the ledge 28 to the top surface 22. As seen in FIG. 7, the bottom surface 24 has a circular cutout 32 at the center thereof with a throughbore 34 extending from the cutout 32 to the peripheral edge 26.

FIG. 8 shows the light source 14 securely mounted at the center of the lamp base 12. The light source 14 includes a lamp 36, such as a 25-watt light bulb, which is secured by a lamp holder 38 in a conventional manner such that the lamp 36 extends upwardly from the top surface 22 of the lamp base 12. As seen in FIG. 7, a power cord 40 extends from the lamp 36 into the cutout 32 and through the throughbore 34 to allow the base 12 to flatly rest on its bottom surface 24. Alternatively, the lamp may be battery powered.

As best shown in FIG. 8, the lampshade 16 presents an envelope-type structure having an inner lens 46, combined image 48 and outer lens 50. The lenses 46 and 50 and the combined image 48 are all frustums of a pyramid or truncated pyramids. The outer lens 50 may be slightly larger than the inner lens 46 to permit the combined image 48 to be sandwiched or enveloped therebetween.

Inner and outer lenses 46 and 50 are a transparent material, preferably 40 millimeter polyethylene sheets sold under the brand name Mylar®. The combined image 48 is a translucent material, such as vellum.

Method of Forming the Lampshade

Figure 4:
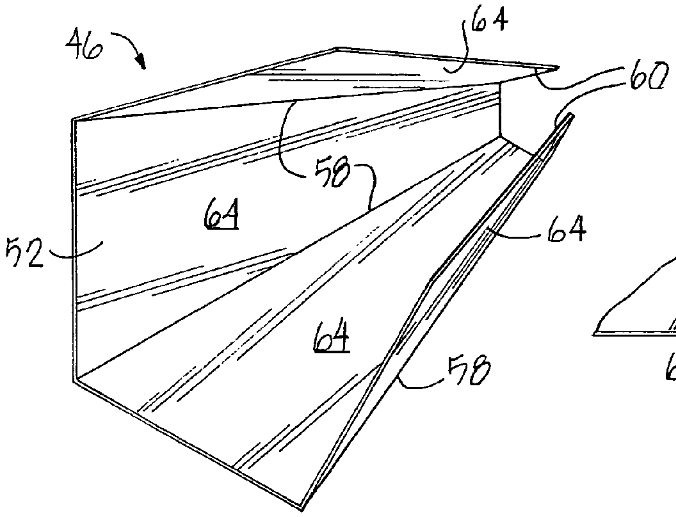
FIG. 4 illustrates the transparent inner or outer lens partially folded.
Figure 5:
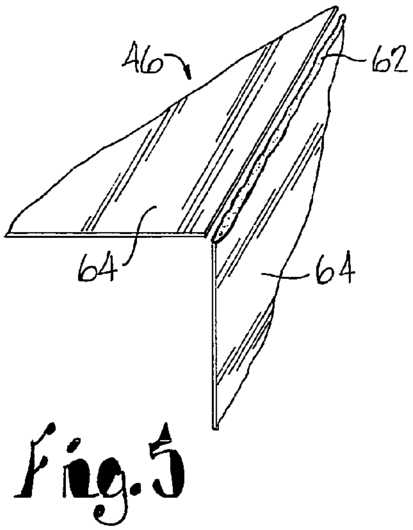
FIG. 5 is a detailed view showing the lens fully folded with adhesive applied to join the mating edges.

The method of forming the inner and outer lenses 46 and 50 is shown in FIGS. 2, 4 and 5. Although the lens shown in these figures is referenced to as the inner lens 46, the identical method applies to forming the outer lens 50.

A flat transparent sheet 52 is die-cut into the shape corresponding to a truncated pyramid, as seen in FIG. 2. The sheet 52 is scored to present fold lines 58. Next, sheet 52 is folded along the fold lines 58, as shown in FIG. 4. Thus, inner and outer lenses 46 and 50 present four inner and four outer sides 64. The free end edges 60 of the sheet 52 are secured together along the length thereof with a transparent adhesive 62, as shown in FIG. 5, or other suitable means.

Figure 6:
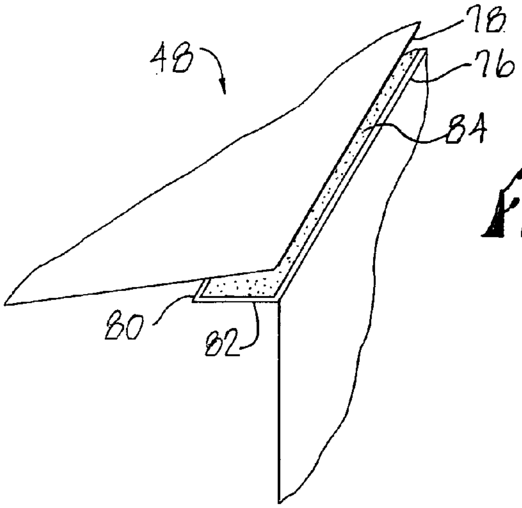
FIG. 6 is a detailed view showing the adhesive strip joining the free edges of combined image medium.

The method of forming the combined image 48 is shown in FIGS. 3 and 6. The display images 18 are first scanned and printed as necessary. The images 18 can be grouped together and aligned as desired. The grouped images 18 are cropped to correspond to the shape of a lens side 64, creating an image sector 68. Four image sectors 68 are digitally assembled with a seamless match between them and transferred or copied onto a vellum sheet 54 or other suitable sheet material. The sheet 54 is die-cut into a shape corresponding to a truncated pyramid, as seen in FIG. 3 to create the combined image 48.

The vellum sheet 54 is also scored to form fold lines 70, 72, 74 and 76. The sheet 54 is then folded along each fold line 70, 72, 74 and 76 in a fashion similar to that shown and described with respect to the transparent sheet 52 in FIG. 4. The free end edges 78 and 80 can then be secured together. More specifically, the vellum sheet 54 presents an adhesive lip 82 between the fold line 76 and the end edge 80. A transparent adhesive strip 84 is secured along the length of this adhesive lip 82, as shown in detail in FIG. 6. End edge 78 actually overlaps end edge 80 and is secured over lip 82, adjacent fold line 76. Alternatively, it is contemplated that the end edges 78 and 80 of the combined image 48 could be adhered in the same manner that end edges 60 of the sheet 52 are secured together, as described above.

Once formed as described above, the inner and outer lenses 46 and 50 and the combined image 48 nest together as shown in FIG. 8, with the inner lens 46 presenting the interior side of the lampshade 16, the outer lens 50 presenting the exterior side of the lampshade 16, and the combined image 48 sandwiched therebetween. The inner lens 46 supports the combined image 48 and the outer lens 50. The outer lens 50 stacks over the combined image 48 and the inner lens 46 to hold the combined image 48 in place.

When assembled as in FIG. 1, the three-element envelope lampshade 16 is held upright and in place on the lamp base 12, as its continuous lower edge rests on the ledge 28 and against the tapered lip 30. The truncated pyramidal shape of the lampshade 16 presents an opening 86 at the top thereof which allows ventilation when the lamp 36 is operating.

The lamp 36 thereby provides an illumination source that backlights the combined image 48 or penetrates and diffuses through the combined image 48 for the desired effect. The generally pyramidal shape of the lampshade 16 enhances the reflection of light from the surfaces of the lenses 46 and 50. The effect can be even further enhanced if the top surface 22 of the lamp base 12 is made reflective. This can be done by applying reflective paint or reflective adhesive stripping. Thus, the combined image 48 is sandwiched between the lenses 46 and 50 to provide back lighted translucency and allows penetrating light rays to create the artistic appeal, interest and atmosphere. Also, the combined image 48 could be laser or die cut (not shown) to form apertures that project a desired effect. The images 18 on the combined image 48 can be photos, art, digital art, graphics, text or any other scanned image, or hand-painted designs. Also, the images 18 may be collected via the internet and digitally assembled.

An embodiment of the image displaying lamp 10 has been shown and described in detail above. However, it should be noted that the light source 14 can be provided by any conventional means, including light emitting diodes or fluorescent lamps. Furthermore, the lampshade can take the form of any number of geometric shapes, such as cones, columns or cubes. The images 18 can be assembled on a range of mediums, such as paper, plastic or a film negative, including those that are transparent or more opaque than vellum. The image source may comprise original art as well as existing art, and may be in digital form as set forth above. Text may be added to the pictorial image.

The form of the lamp 10 can be modified also. For instance, the lamp 10 could be a floor lamp or chandelier incorporating several lampshades 16. Lampshades 16 can be replacements for a user's already existing shades. Furthermore, the single light source could be modified to include any number of light sources, as desired. In commercial applications the lamp 10 may present a table tent that displays a menu, for example.

It should be understood that while certain forms of this invention have been illustrated and described, it is not limited thereto except insofar as such limitations are included in the following claims.

Having thus described the invention, what is claimed as new and desired to be secured by Letters Patent is as follows:

1. A method for creating and displaying images, said method comprising the steps of:

(a) forming an inner lens of transparent sheet material having a predetermined geometric configuration and presenting a plurality of inner sides, (b) creating a plurality of images, (c) assembling said images on a translucent medium having sectors substantially conforming in shape to corresponding inner sides, (d) forming said translucent medium into said geometric configuration, (e) forming an outer lens of transparent sheet material having said geometric configuration, and presenting outer sides conforming in shape to said inner sides, (f) nesting said inner lens within said outer lens with said image medium sandwiched therebetween to provide an envelope assembly, and (g) supporting said envelope assembly on a base member, said envelope assembly adapted to be backlit by a light source to create a desired visual effect.

2. The method as claimed in claim 1, wherein said step (c) includes cropping said images to the shape of a corresponding lens side, and printing said images on said medium.

3. The method as claimed in claim 1, wherein said base member of step (g) includes a lamp base having a light source mounted thereon.

4. The method as claimed in claim 1, wherein said step (b) includes grouping said plurality of images into a plurality of image sectors equal in number to said plurality of inner sides.

5. A method for creating and displaying images, said method comprising the steps of:

(a) forming an inner lens of transparent sheet material presenting an inner side, said lens having a predetermined configuration, (b) scanning a plurality of images to provide a plurality of image sectors, (c) digitally assembling said image sectors to substantially correspond to the shape of said inner side, (d) printing said assembled image sectors on a translucent medium conforming in shape to said inner side, (e) forming said medium into said configuration of said inner lens, (f) forming an outer lens of transparent sheet material presenting an outer side and having said configuration of said inner lens, (g) nesting said inner lens within said outer lens with said image medium sandwiched therebetween to provide an envelope assembly, and (h) supporting said envelope assembly on a base member, said envelope assembly adapted to be backlit by a light source to create a desired visual effect.

6. The method as claimed in claim 5, wherein said base member of step (h) includes a lamp base having a light source mounted thereon.

7. The method as claimed in claim 5, wherein said step (a) includes forming said inner lens to present a plurality of inner side elements defining said inner side.

8. The method as claimed in claim 7, wherein step (c) includes assembling said images into a plurality of said image sectors equal in number to and corresponding in shape to said plurality of inner side elements.

9. The method as claimed in claim 5, wherein said inner lens, said translucent image medium and said outer lens are formed into a generally pyramidal configuration.

10. An image display device comprising:

an inner lens of transparent sheet material having a predetermined geometric configuration and presenting a plurality of inner sides, a translucent medium having said geometric configuration and including a plurality of side-by-side image sectors thereon equal in number to said plurality of inner sides, conforming in shape to said inner sides and presenting a combined image, and an outer lens of transparent sheet material having said geometric configuration and presenting outer sides that conform in shape to said inner sides, said inner lens nesting within said outer lens with said medium sandwiched therebetween to provide an envelope assembly adapted to be backlit by a light source to create a visual effect that presents said combined image.

11. The image display device as claimed in claim 10, wherein said inner lens, said translucent medium and said outer lens have a generally pyramidal configuration.

12. The method as claimed in claim 1, wherein said inner lens, said translucent medium and said outer lens have a generally pyramidal configuration.

* * * * *